United States Patent
Baykal et al.

(10) Patent No.: US 8,967,460 B1
(45) Date of Patent: Mar. 3, 2015

(54) SYSTEM AND METHOD FOR SERVICING A DEVICE HAVING A MATRIX BARCODE

(71) Applicant: Calix, Inc., Petaluma, CA (US)

(72) Inventors: Berkay Baykal, Westborough, MA (US); Shaun Noel Missett, Avon, CT (US); Harold A. Roberts, Excelsior, MN (US); Michael Oquist, Monticello, MN (US); Allen James Sabean, Falcon Heights, MN (US); Zachary Perkins, Maple Grove, MN (US)

(73) Assignee: Calix, Inc., Petaluma, CA (US)

( * ) Notice: Subject to any disclaimer, the term of this patent is extended or adjusted under 35 U.S.C. 154(b) by 0 days.

(21) Appl. No.: 14/038,169

(22) Filed: Sep. 26, 2013

(51) Int. Cl.
*G06F 17/00* (2006.01)
*G06F 17/30* (2006.01)

(52) U.S. Cl.
CPC .............................. *G06F 17/30879* (2013.01)
USPC .... 235/375; 235/487; 235/462.09; 235/462.1

(58) Field of Classification Search
USPC ............ 235/375, 487, 462.01, 462.09, 462.1, 235/494, 454
See application file for complete search history.

(56) References Cited

U.S. PATENT DOCUMENTS

| | | | |
|---|---|---|---|
| 2005/0082359 A1* | 4/2005 | Marggraff et al. | 235/375 |
| 2010/0057900 A1* | 3/2010 | Ootsuka | 709/223 |
| 2012/0019674 A1* | 1/2012 | Ohnishi et al. | 348/207.1 |
| 2012/0217293 A1* | 8/2012 | Martch et al. | 235/375 |
| 2013/0071029 A1* | 3/2013 | Terwilliger et al. | 382/183 |
| 2013/0087609 A1* | 4/2013 | Nichol et al. | 235/375 |
| 2013/0098989 A1* | 4/2013 | Salzman et al. | 235/375 |
| 2013/0299569 A1* | 11/2013 | Gentile et al. | 235/375 |

OTHER PUBLICATIONS

"Barcode", "retrieved from http://en.wikipedia.org/wiki/Barcode on Sep. 23, 2013", last udpated Sep. 20, 2013, pp. 1-17.
Calix, "Calix Mobile Apps Smart Activate", "retrieved from http://www.calix.com/mobile/apps/smartactivate.html on Sep. 23, 2013", 2013, p. 1.
"QR code", "retrieved from http://en.wikipedia.org/wiki/QR_code on Sep. 23, 2013", last updated Sep. 15, 2013, pp. 1-11.

* cited by examiner

*Primary Examiner* — Edwyn Labaze
(74) *Attorney, Agent, or Firm* — Fogg & Powers LLC

(57) ABSTRACT

A method of servicing a target device having a matrix barcode comprises analyzing data from a scan of the matrix barcode on the target device to obtain device identification information encoded in the matrix barcode; obtaining secondary information related to the target device; associating the device identification information with the secondary information; and transmitting the device identification information and secondary information over a network to a back office system.

20 Claims, 3 Drawing Sheets

SYSTEM AND METHOD FOR SERVICING A DEVICE HAVING A MATRIX BARCODE

BACKGROUND

In a communications network providing one or more services to customers, multiple network and customer devices are used. Activation and/or maintenance of the network and customer devices can become costly and/or time consuming.

SUMMARY

In one embodiment, a method of servicing a target device having a matrix barcode is provided. The method comprises analyzing data from a scan of the matrix barcode on the target device to obtain device identification information encoded in the matrix barcode; obtaining secondary information related to the target device; associating the device identification information with the secondary information; and transmitting the device identification information and secondary information over a network to a back office system.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
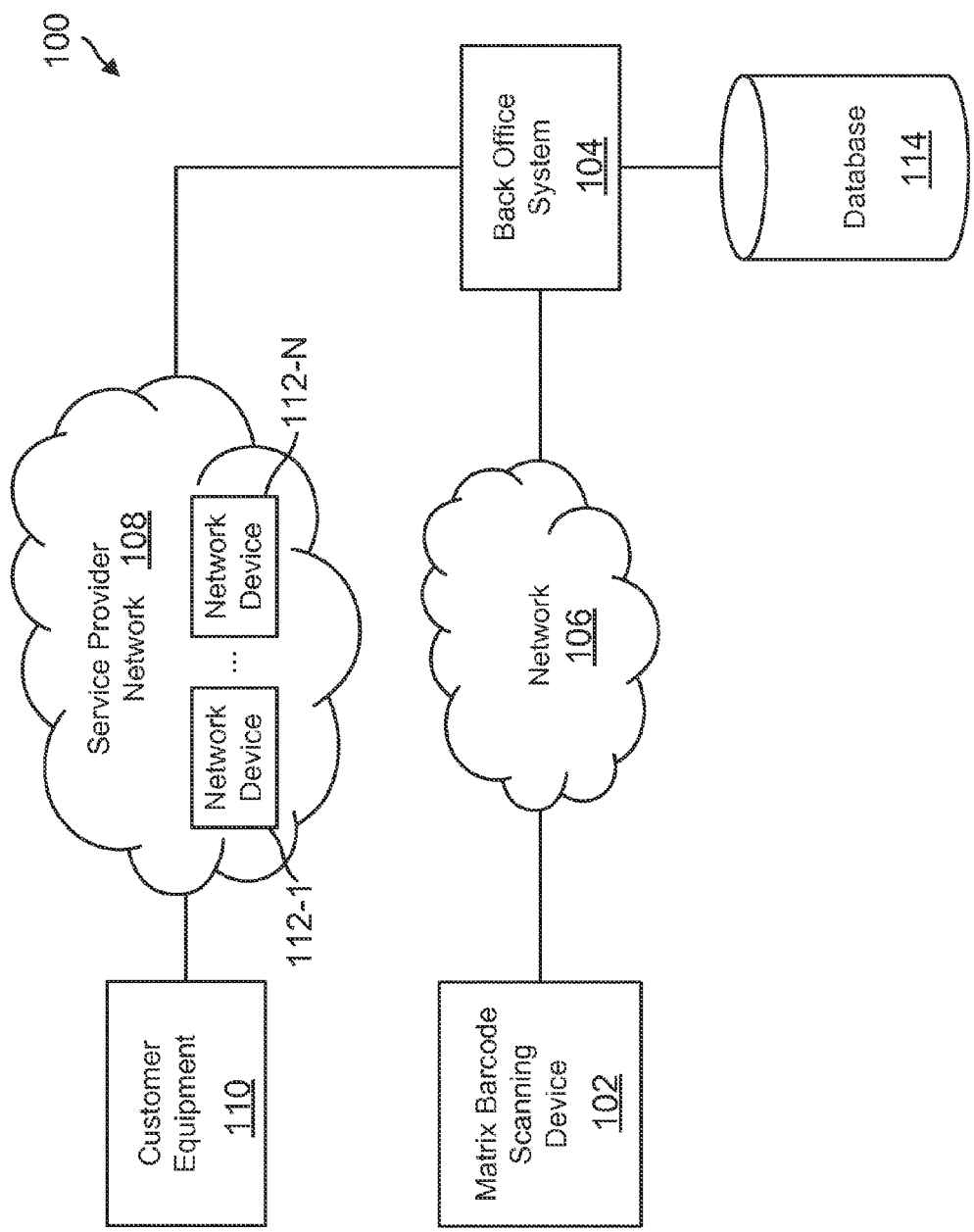
FIG. 1 is a high level block diagram of one embodiment of an exemplary system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high level block diagram of an exemplary system 100. System 100 includes a matrix barcode (also referred to as a 2 Dimensional barcode) scanning device 102 coupled to a back office system 104 via a network 106. As used herein, the term "back office system" refers to a sub-network within service provider network 108 responsible for managing or otherwise supporting delivery of one or more services to customer premises. For example, the back office system 104 can be connected to an inventory management system which keeps track of the company inventory of the deployed customer equipment and allows automatic re-order of depleted equipment and/or a database of equipment failures/Return Merchandise Authorizations (RMAs), etc. Additionally, the back office system 104 can be configured to provision or otherwise configure one or more of network devices 112-1 ... 112-N within service provider network 108 to provide the one or more services to the customer equipment 110. To that end, network devices 112-1 ... 112-N can each be implemented as one of an access node, a router, a switch, a repeater, or an aggregation node, etc., as known to one of skill in the art. The network devices 112-1 ... 112-N can be implemented using any appropriate technology for communication of data. For example, an access node can be implemented as an optical node unit (ONU), cable modem, digital subscriber line (DSL) modem, etc.

Exemplary services which can be provided to the customer equipment 110 include, but are not limited to, internet service, a television service (such as a cable television service), and/or a telephone service (either by way of a plain old telephone system (POTS), which is often referred to as a "landline" service or as a Voice over IP (VoIP) service). In some instances, a service provider that owns and operates service provider network 108 may provide the infrastructure by which to provide one or more of the above noted services. Competing service providers may also contract with the service provider that owns and operates service provider network 108 to provide competing and additional services to those provided by the service provider that owns and operates service provider network 108. In any event, the service provider network 108 may provide a collection of one or more services, such as the services discussed above.

The customer equipment 110, which may also be referred to herein as a "subscriber device", may include Internet-ready televisions, non-Internet-ready televisions, set-top boxes (STBs), gaming consoles, personal media players, digital video disc (DVD) players, Blu-ray players, desktop computers, laptop computers, slate or tablet computers, wireless telephones (including so-called "smart phones"), global positioning system (GPS) devices, wireless access points (WAPs), switches, hubs, printers, servers, and any other similar devices commonly employed by customers to access one or more of the services provided by service provider network 108.

The matrix barcode scanning device 102 is used to scan a matrix barcode on the customer equipment 110 and/or one or more of the network devices 112-1 ... 112-N. The matrix barcode included on the customer equipment 110 or the network devices 112-1 ... 112-N can be implemented using any suitable 2 Dimensional code for representing information, such as, but not limited to, Aztec code, Data Matrix, High Capacity Color Barcode, MaxiCode, PDF417, Quick Response (QR) code, ShotCode, SPARQCode, etc. Additionally, the matrix barcode scanning device 102 can be implemented as any device capable of scanning a matrix barcode. For example, in some embodiments, the matrix barcode scanning device 102 is a dedicated barcode reader whose primary function is to scan and obtain data from a matrix barcode. In other embodiments, a multi-function device can be used, such as a smart phone, tablet computer, or other mobile or handheld computing device on which modules or applications can be installed to provide additional functionality. Additionally, the matrix barcode scanning device 102 can be implemented using any suitable technology for reading a matrix barcode. For example, suitable barcode reading technologies include, but are not limited to, laser scanners, charge-coupled device (CCD) readers, and camera based readers.

The matrix barcode scanning device 102 can be used to scan the matrix barcode during installation of a device and/or troubleshooting a failure in a service associated with a device. For example, when installing or setting up customer equipment 110 to communicate with service provider network 108 for providing a service, the matrix barcode scanning device 102 is used to scan a matrix barcode on the customer equipment 110. The matrix barcode scanning device 102 obtains identification information which uniquely identifies the customer equipment 110. For example, the matrix barcode can provide one or more of a serial number, manufacturer information, device model information, a media access control (MAC) address, firmware revision information, firmware revision history for the device, manufacturing date, Full Service Access Network (FSAN) identification (ID), service set ID (SSID) used by the device, Common Language Equipment Identification (CLEI) codes, and/or other device identifying information.

In addition to the device identification information obtained from the matrix barcode, the matrix barcode scanning device 102 is configured to obtain secondary information from an auxiliary data source, such as location or subscriber information, as described in more detail below. The matrix barcode scanning device 102 is configured to associate the secondary information with the device identification information and to transmit the associated secondary and device identification information to the back office system 104 via the network 106. As used herein, the term "device identification information" refers to information which inherently identifies a device, such as a serial number or MAC address, for example. Also, as used herein, the term "secondary information" refers to information related to the device, but that does not inherently identify the device, such as location or subscriber information, for example.

In some embodiments, the network 106 is separate from the service provider network 108. In other embodiments, the network 106 forms at least part of the service provider network 108. For example, the network 106 can be implemented as a cellular radio frequency (RF) network, a local area network, an access network, and/or a public network, such as the Internet. Additionally, the matrix barcode scanning device 102 can communicate with the network 106 via a wired or wireless connection.

Upon receiving the associated secondary and device identification information, the back office system 104 stores the associated data in database 114. In addition, in some embodiments, the back office system 104 configures or provisions one or more network devices 112 to provide a respective service. For example, the back office system 104 can configure the network to accept a newly installed network device or to permit access to the service provider network 108 by the customer equipment 110.

In some embodiments, the back office system 104 provides information to the matrix barcode scanning device 102 via the network 106. For example, the back office system 104 provides installation manuals, videos, etc. to an installer or customer to aid in the installation of the customer equipment or network device. In other embodiments, the back office system 104 analyzes the associated secondary and device identification information to provide recommendations for improved or additional services. For example, if the device being installed is not recommended or compatible with the desired service, an alternative device can be suggested. Similarly, the back office system 104 can provide recommendations for additional available services based on the capabilities of the device being installed and the location of the device.

In addition, when a technician is servicing a network device 112 or customer equipment 110, the back office system 104 can provide information regarding the original installation based on the associated secondary and device identification information provided by the matrix barcode scanning device 102. For example, the back office system 104 can provide photographs of the original installation, compass or gyroscope information regarding the orientation of the device, date and time of installation, etc., as described in more detail below.

Figure 2:
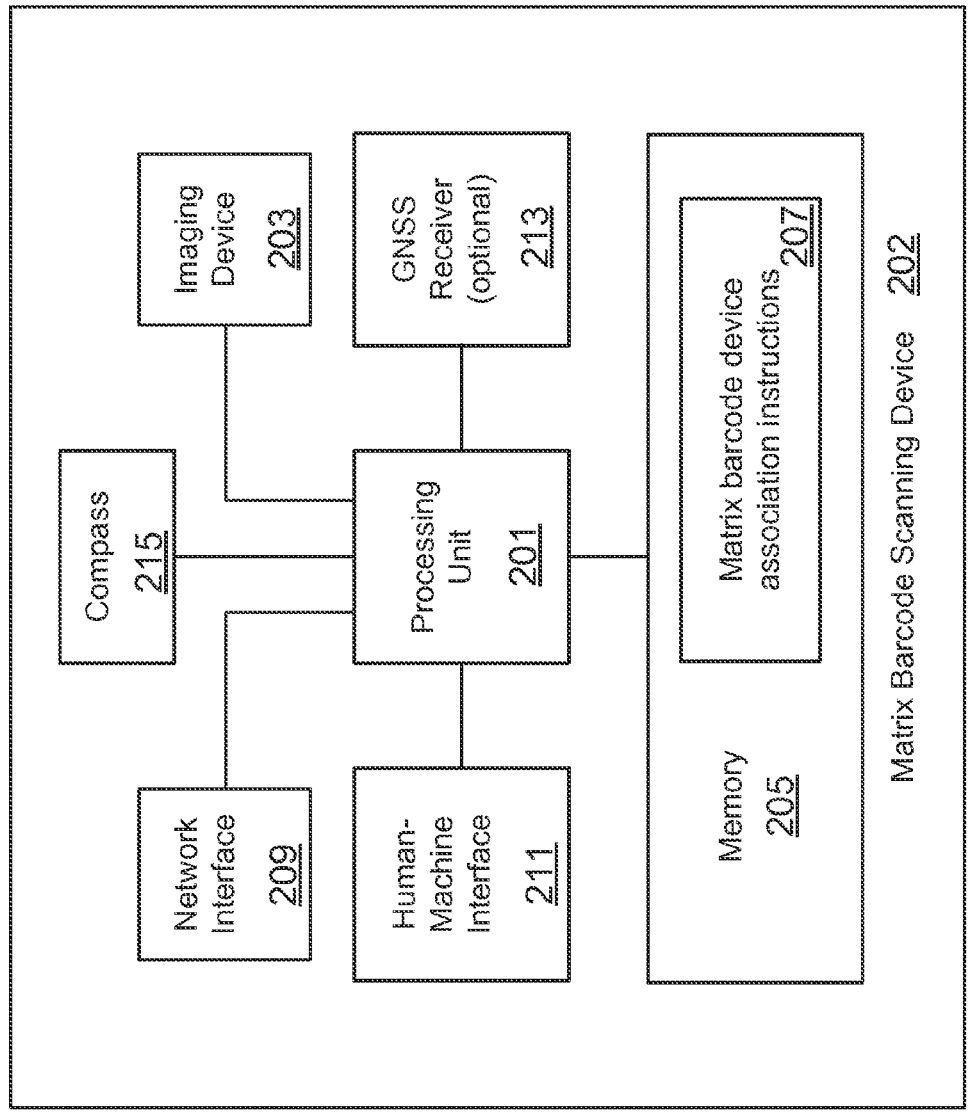
FIG. 2 is a high level block diagram of one embodiment of an exemplary matrix barcode scanning device.

FIG. 2 is a high level block diagram of an exemplary matrix barcode scanning device 202 which can be used in system 100 above. Matrix barcode scanning device 202 includes an imaging device 203 such as, but not limited to, a laser scanner, a CCD image sensor, a Complementary metal-oxide-semiconductor (CMOS) image sensor, etc. The imaging device 203 obtains an image or other representation (e.g. voltage pattern) of a matrix barcode on a customer or network device. The processing unit 201 is configured to decode the matrix barcode to obtain the device identification information. In particular, in this example, the processing unit 201 is configured to execute matrix barcode device association instructions 207 which cause the processing unit 201 to analyze and extract the device identification information from the matrix barcode.

In addition, the matrix barcode device association instructions 207 cause the processing unit 201 to associate secondary information with the device identification information. For example, in this embodiment, the device 202 includes an optional Global Navigation Satellite System (GNSS) receiver 213. The GNSS receiver 213 obtains measurements used by the processing unit 201 to determine a location of the device 202. Hence, in this embodiment, the secondary information can include location information obtained via the GNSS receiver 213. In addition, the secondary information can include information obtained from the Human-Machine Interface (HMI) 211. The HMI 211 enables communication of data to a user and input of data from a user. For example, the HMI 211 includes, in some embodiments, a display unit capable of displaying text and/or graphics to a user. Suitable display units can include, but are not limited to, a cathode ray tube (CRT) display, an active matrix liquid crystal display (LCD), a passive matrix LCD, light emitting diode (LED) display, or plasma display unit. In particular, the processing unit 201 outputs control signals to the HMI 211 to cause the HMI 211 to produce a prompt (e.g. visual or audible) requesting user input.

The HMI 211 also includes, in some embodiments, a user input element configured to receive data from a user. For example, the user input element can be implemented as, but is not limited to, a physical keyboard, a virtual keyboard, a touch screen, a microphone, a cursor control device, line select buttons, etc. In some embodiments, user input element comprises more than one type of input element. The processing unit 201, outputs, control signals to the HMI 211 to cause the HMI 211 to provide the user input to the processing unit 201.

Hence, the secondary information includes, in some embodiments, data input from a user via the user input element. For example, the instructions 207 can cause the processing unit to display a prompt on a display of the HMI 211 to request input from a user which the user then provides via the user input element of the HMI 211. Such user data can include, but is not limited to, subscriber name, subscriber address, billing information, selection of available services, etc. In addition to, or in lieu of, the secondary information discussed above, the secondary information may also include, in some embodiments, data from other sub-systems or sensors in the device 202, such as, but not limited to, orientation readings from an optional compass and/or gyroscope 215, photos/videos of the install from the imaging device 203 or a separate camera, etc. Hence, the secondary information can include information used for provisioning of a selected service and/or information used to troubleshoot problems with the provided service(s).

After associating the secondary information with the device identification information, the instructions 207 cause the processing unit 201 to transmit the associated information over the network interface 209. The network interface 209 couples the device 202 to a back office system over a network, such as back office system 104 coupled to device 102 via network 106. Hence, the network interface 209 implements a corresponding technology for communicating over a network. Additionally, the network interface 209 can be implemented as a wireless and/or wired interface. For example, in some embodiments implementing a wireless interface, the network interface 209 can be implemented as radio frequency (RF) receiver for receiving RF cellular signals and/or a Wi-Fi transceiver for transmitting and receiving signals as described in the Institute of Electrical and Electronics Engineers (IEEE) 802.11 family of standards.

In addition, data can be received from the back office system via the network interface 209. For example, support materials, such as installation or troubleshooting manuals, videos, tips, etc. can be provided over the network interface 209 and communicated to the user via the HMI 211 for use during installation or maintenance of a device. Additionally, in some embodiments, support materials include information obtained during an install of a customer or network device that is provided from the back office system over the network interface 209 while troubleshooting the customer or network device. For example, photos of the wiring, or orientation of the customer or network device, etc. can be provided to help troubleshoot an error and, thereby, reduce the time needed to troubleshoot the error.

Hence, the processing unit includes or functions with software programs, firmware or other computer readable instructions for carrying out various methods, process tasks, calculations, and control functions, as described above. These instructions are typically stored on any appropriate computer readable medium used for storage of computer readable instructions or data structures, such as memory 205. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc.

Figure 3:
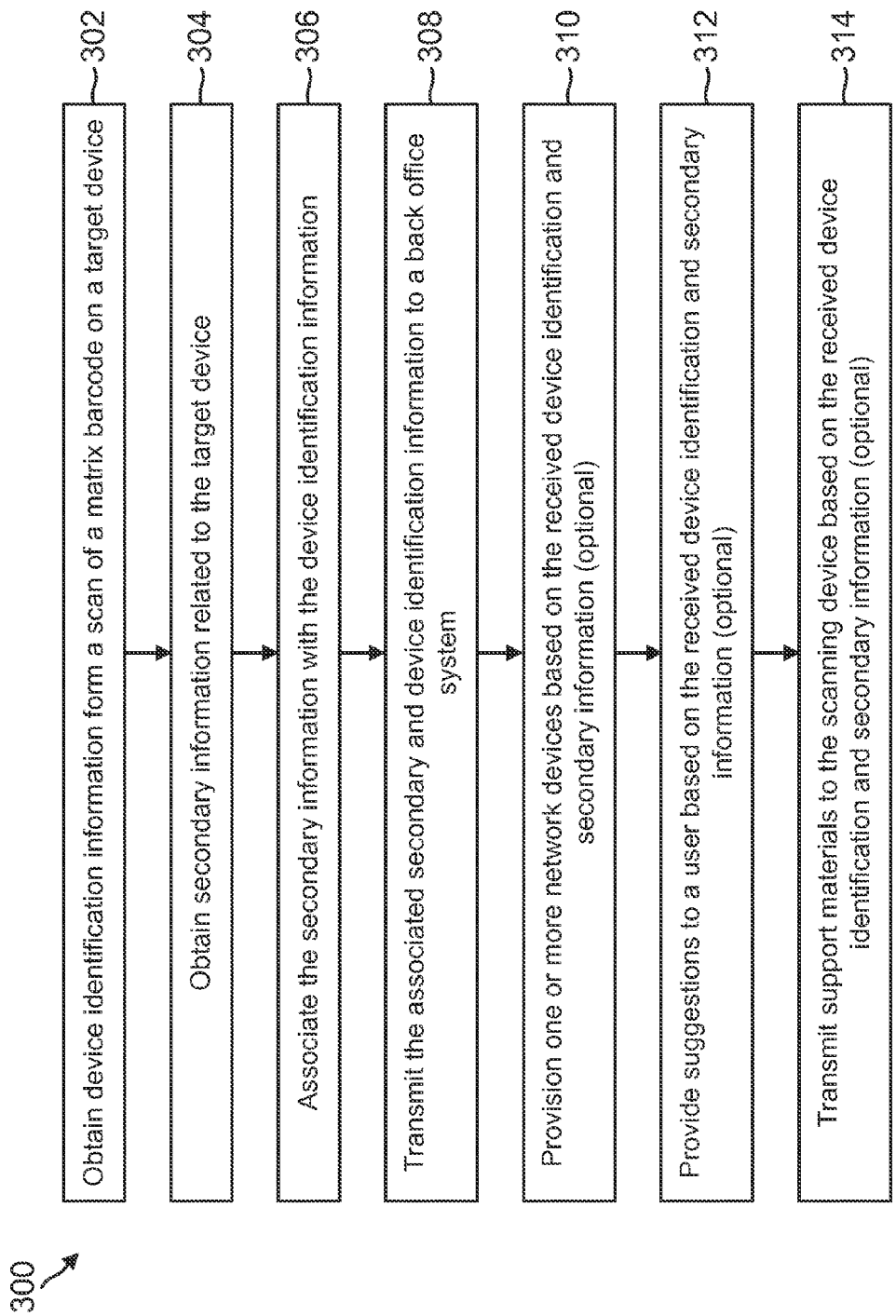
FIG. 3 is a flow chart depicting one embodiment of an exemplary method of servicing a device having a matrix barcode.

FIG. 3 is a flow chart depicting one embodiment of a method 300 of servicing a target device having a matrix barcode. As used herein, the term "target device" refers to a device to be installed or otherwise services, such as maintenance or repair. In addition, the term "servicing", as used herein, refers to installation/activation and/or maintenance/repair activities. Method 300 can be implemented by a scanning device such as device 202 discussed above. At block 302, device identification information is obtained from a scan of a matrix barcode on a corresponding target device. In particular, a scanning device scans and analyzes the matrix barcode to decode information which identifies the particular target device corresponding to the matrix barcode. At block 304, secondary information related to the target device having the matrix barcode is obtained by the scanning device from an auxiliary source. For example, in some embodiments, the processing unit 201 obtains location information by processing data from a GNSS receiver; a Wi-Fi positioning system, or through RF cellular signal triangulation. The use of a GNSS receiver, Wi-Fi positioning system, and RF cellular triangulation is known to one of skill in the art and not described in more detail herein.

In other embodiments, the scanning device obtains from a user via a user input element, as discussed above. For example, the scanning device can provide a prompt (e.g. audible and/or visible prompt) to a user to request information such as, but not limited to, the service or services desired, billing information, address, etc. In some embodiments, fields for the requested information can be auto-populated and a user can update or change the information as needed. For example, the address information can be auto-populated based on location information obtained from, RF cellular triangulation, a GNSS receiver and/or Wi-Fi positioning system.

At block 306, the secondary information is associated with the device identification information. For example, a single file can be created, in some embodiments, containing both the secondary and device identification information. Alternatively, the secondary information can be maintained separate from the device identification information, but a reference or link is created associating the secondary and device identification information. At block 308, the associated secondary and device identification information is transmitted over a network to a back office system. In some embodiments, the secondary and device identification information are associated together as part of transmitting the respective information. For example, the secondary information can be transmitted separately from the device identification information and an indication of the association is transmitted to the back office system which stores and associates the secondary and device identification information.

In some embodiments, one or more network devices are optionally provisioned by the back office system based on the received device identification and secondary information at block 308. In particular, the one or more network devices are provisioned for the desired service. Additionally, in some embodiments, the back office system optionally provides suggestions to a user based on the received device identification and secondary information at block 310. For example, the back office system can send suggestions regarding additional or alternative services and/or devices for the desired service to the scanning device for communication to the user, as discussed above. At block 312, the back office system optionally transmits support materials (e.g. installation or troubleshooting information) to the scanning device based on the received device identification and secondary information. For example, in some embodiments, based on the device identification information and/or secondary information, the back office system transmits one or more of installation manuals, videos, photographs of the original installation of the device having the scanned matrix barcode, etc., as discussed above.

Hence, the exemplary embodiments described herein provide various benefits. For example, through the use of a matrix barcode, the embodiments described herein enable the elimination of multiple 1 dimensional barcodes. In particular, conventional devices include a plurality of 1 dimensional barcodes, each used for a respective identification value. However, by encoding a plurality of identification values in a single matrix barcode, the embodiments herein reduce the cost associated with printing multiple 1 dimensional barcodes as well as the time taken to scan each 1 dimensional barcode. Additionally, by associating secondary information with the extracted identification information, the embodiments described herein streamline installation and maintenance of a customer or network device. For example, additional information can be provided to the user installing the device, as discussed above, and/or provisioning the network for the selected service can be based on the associated identification and secondary information.

EXAMPLE EMBODIMENTS

Example 1 includes a method of servicing a target device having a matrix barcode. The method comprises analyzing data from a scan of the matrix barcode on the target device to obtain device identification information encoded in the matrix barcode; obtaining secondary information related to the target device; associating the device identification information with the secondary information; and transmitting the device identification information and secondary information over a network to a back office system.

Example 2 includes the method of Example 1, wherein obtaining secondary information comprises obtaining location information via one or more of a Global Navigation Satellite System (GNSS) receiver; a WiFi Positioning System (WPS), or cellular signal triangulation.

Example 3 includes the method of any of Examples 1-2, wherein obtaining secondary information comprises: requesting user input via at least one of visual and audio prompts from a human machine interface; and receiving the requested user input via the human machine interface.

Example 4 includes the method of any of Examples 1-3, further comprising provisioning a service provider network via the back office system for a service to the device based on the associated device identification information and secondary information received at the back office system.

Example 5 includes the method of any of Examples 1-4, further comprising transmitting support materials from the back office system over the network to a user in response to receiving the device identification information and the secondary information at the back office system, the installation information and the maintenance information relating to the device identified by the device identification information.

Example 6 includes a program product comprising a non-transitory processor-readable medium on which program instructions are embodied, wherein the program instructions are configured, when executed by at least one programmable processor, to cause the at least one programmable processor to obtain device identification information from a scan of a matrix barcode on a target device; to associate the device identification information with secondary information related to the target device; and to transmit the device identification information and the secondary information over a network to a back office system.

Example 7 includes the program product of Example 6, wherein the secondary information includes location information; wherein the program instructions are further configured to cause the at least one programmable processor to determine the location information based on data received from at least one of a Global Navigation Satellite System (GNSS) receiver, a WiFi Positioning System (WPS), and a radio frequency (RF) receiver.

Example 8 includes the program product of any of Examples 6-7, wherein the program instructions are further configured to cause the at least one programmable processor to output control signals to a human-machine interface to cause the human-machine interface to produce a prompt requesting user input and to provide the user input to the at least one programmable processor, the user input being secondary information.

Example 9 includes the program product of any of Examples 6-8, wherein the program instructions are further configured to cause the at least one programmable processor to obtain an image from an imaging device, the secondary information including the image.

Example 10 includes the program product of any of Examples 6-9, wherein the program instructions are further configured to cause the at least one programmable processor to process installation data or maintenance data received over a network interface from the back office system; and to direct a human-machine interface to display the received installation data or maintenance data.

Example 11 includes a matrix barcode scanning device. The matrix barcode scanning device comprises an imaging device configured to scan a matrix barcode affixed to a target device; a processing unit configured to extract device identification information from the scan of the matrix barcode, the device identification information identifying the target device; and a network interface configured to transmit and receive data over a network. The processing unit is further configured to associate the device identification information with secondary information related to the target device. The processing unit is further configured to transmit the device identification information and the secondary information over the network via the network interface to a back office system.

Example 12 includes the matrix barcode scanning device of Example 11, further comprising a human-machine interface configured to provide a prompt to a user to request user input, the human-machine interface further configured to receive the user input and provide the user input to the processing unit; wherein the secondary information comprises the user input.

Example 13 includes the matrix barcode scanning device of any of Examples 11-12, further comprising a global navigation satellite system (GNSS) receiver configured to provide location data to the processing unit for determining a location of the matrix barcode scanning device; wherein the secondary information comprises the location of the matrix barcode scanning device.

Example 14 includes the matrix barcode scanning device of any of Examples 11-13, wherein the network interface is configured to transmit and receive radio frequency (RF) cellular signals; wherein the processing unit is configured to calculate a location of the matrix barcode scanning device based on triangulation using received cellular signals; wherein the secondary information comprises the calculated location.

Example 15 includes the matrix barcode scanning device of any of Examples 11-14, wherein the network interface is configured to transmit and receive Wi-Fi signals; wherein the processing unit is configured to calculate a location of the matrix barcode scanning device based on data from a Wi-Fi positioning system; wherein the secondary information comprises the calculated location.

Example 16 includes the matrix barcode scanning device of any of Examples 11-15, further comprising a compass configured to measure the orientation of the matrix barcode scanning device when scanning the matrix barcode; wherein the secondary information comprises the measured orientation.

Example 17 includes a communications network. The communications network comprises a matrix barcode scanning device configured to scan a matrix barcode on a target device to obtain device identification information encoded in the matrix barcode; and a sub-network configured to manage or support delivery of one or more services to customer premises; wherein the matrix barcode scanning device is further configured to obtain secondary information related to the target device from one or more auxiliary sources; to associate the device identification information with the secondary information; and to transmit the device identification information and the secondary information to the sub-network over the communications network or over a second network; wherein the sub-network is configured to store the device identification information and the associated secondary information.

Example 18 includes the communications network of Example 17, wherein the secondary information comprises one or more of location information, orientation information, user input, and a photograph.

Example 19 includes the communications network of any of Examples 17-18, wherein the sub-network is configured to provision one or more network devices in the communications network to provide the one or more services to the customer premises based on the device identification information and the secondary information received from the matrix barcode scanning device.

Example 20 includes the communications network of any of Examples 17-19, wherein the sub-network is configured to provide support materials to the matrix barcode scanning device based on the device identification information and the secondary information.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of servicing a target device having a matrix barcode, the method comprising:
   analyzing data from a scan of the matrix barcode on the target device to obtain device identification information encoded in the matrix barcode;
   obtaining secondary information related to an installation of the target device;
   associating the device identification information with the secondary information related to the installation of the target device; and
   transmitting the device identification information and secondary information over a network to a back office system configured to manage or support delivery of one or more network services to customer premises, the back office system further configured to store the device identification information and the associated secondary information;
   wherein the target device is one of a network device or customer equipment for providing the one or more network services;
   wherein the method further comprises at least one of:
   configuring one or more network devices to provide the one or more network services to the target device based on the device identification information and the associated secondary information received at the back office system, wherein the secondary information includes location information;
   transmitting a recommendation for at least one service or device from the back office system over the network to a user based on the device identification information and the associated secondary information received at the back office system; or
   transmitting information related to an original installation of the target device from the back office system over the network to the user in response to receiving the device identification information and associated secondary information.

2. The method of claim 1, wherein obtaining secondary information comprises obtaining location information via one or more of a Global Navigation Satellite System (GNSS) receiver; a WiFi Positioning System (WPS), or cellular signal triangulation.

3. The method of claim 1, wherein obtaining secondary information comprises:
   requesting user input via at least one of visual and audio prompts from a human machine interface; and
   receiving the requested user input via the human machine interface.

4. The method of claim 1, further comprising:
   transmitting the secondary information from the back office system to a matrix barcode scanning device in response to a subsequent scan of the matrix barcode on the target device with the matrix barcode scanning device.

5. A program product comprising a non-transitory processor-readable medium on which program instructions are embodied, wherein the program instructions are configured, when executed by at least one programmable processor, to cause the at least one programmable processor to:
   obtain device identification information from a scan of a matrix barcode on a target device, wherein the target device is one of a network device or customer equipment for providing one or more network services;
   associate the device identification information with secondary information related to an installation of the target device; and
   transmit the device identification information and the secondary information over a network to a back office system configured to manage or support delivery of the one or more network services to customer premises, the back office system further configured to store the device identification information and the associated secondary information.

6. The program product of claim 5, wherein the secondary information includes location information; wherein the program instructions are further configured to cause the at least one programmable processor to determine the location information based on data received from at least one of a Global Navigation Satellite System (GNSS) receiver, a WiFi Positioning System (WPS), and a radio frequency (RF) receiver.

7. The program product of claim 5, wherein the program instructions are further configured to cause the at least one programmable processor to output control signals to a human-machine interface to cause the human-machine interface to produce a prompt requesting user input and to provide the user input to the at least one programmable processor, the user input being secondary information.

8. The program product of claim 5, wherein the program instructions are further configured to cause the at least one programmable processor to obtain an image from an imaging device, the secondary information including the image.

9. The program product of claim 5, wherein the program instructions are further configured to cause the at least one programmable processor to:
   process installation data or maintenance data received over a network interface from the back office system; and direct a human-machine interface to display the received installation data or maintenance data.

10. A matrix barcode scanning device comprising:
an imaging device configured to scan a matrix barcode affixed to a target device, wherein the target device is one of a network device or customer equipment for providing one or more network services;
a processing unit configured to extract device identification information from the scan of the matrix barcode, the device identification information identifying the target device; and
a network interface configured to transmit and receive data over a network;
wherein the processing unit is further configured to associate the device identification information with secondary information related to an installation of the target device; the processing unit further configured to transmit the device identification information and the secondary information over the network via the network interface to a back office system configured to manage or support delivery of the one or more network services to customer premises, the back office system further configured to store the device identification information and the associated secondary information.

11. The matrix barcode scanning device of claim 10, further comprising a human-machine interface configured to provide a prompt to a user to request user input, the human-machine interface further configured to receive the user input and provide the user input to the processing unit;
wherein the secondary information comprises the user input.

12. The matrix barcode scanning device of claim 10, further comprising a global navigation satellite system (GNSS) receiver configured to provide location data to the processing unit for determining a location of the matrix barcode scanning device; wherein the secondary information comprises the location of the matrix barcode scanning device.

13. The matrix barcode scanning device of claim 10, wherein the network interface is configured to transmit and receive at least one of radio frequency (RF) cellular signals or Wi-Fi signals;
wherein the processing unit is configured to calculate a location of the matrix barcode scanning device based on at least one of triangulation using received cellular signals or data from a Wi-Fi positioning system;
wherein the secondary information comprises the calculated location.

14. The matrix barcode scanning device of claim 10, further comprising a compass configured to measure the orientation of the matrix barcode scanning device when scanning the matrix barcode;
wherein the secondary information comprises the measured orientation.

15. A communications network comprising:
a matrix barcode scanning device configured to scan a matrix barcode on a target device to obtain device identification information encoded in the matrix barcode, wherein the target device is one of a network device or customer equipment for providing one or more network services; and
a sub-network configured to manage or support delivery of the one or more services to customer premises;
wherein the matrix barcode scanning device is further configured to obtain secondary information related to an installation of the target device from one or more auxiliary sources; to associate the device identification information with the secondary information; and to transmit the device identification information and the secondary information to the sub-network over the communications network or over a second network;
wherein the sub-network is configured to store the device identification information and the associated secondary information.

16. The communications network of claim 15, wherein the secondary information comprises one or more of location information, orientation information, user input, and a photograph.

17. The communications network of claim 15, wherein the sub-network is configured to provision one or more network devices in the communications network to provide the one or more services to the customer premises based on the device identification information and the secondary information received from the matrix barcode scanning device.

18. The communications network of claim 15, wherein the sub-network is configured to provide support materials to the matrix barcode scanning device based on the device identification information and the secondary information.

19. The communications network of claim 15, wherein the sub-network is configured to transmit at least one of a recommendation for at least one service or device to the matrix barcode scanning device, the recommendation based on the device identification information and the associated secondary information received at the sub-network.

20. The communications network of claim 15, wherein the sub-network is configured to transmit information related to an original installation of the target device to the matrix barcode scanning device in response to receiving the device identification information and associated secondary information.

* * * * *